United States Patent [19]
Blot et al.

[11] Patent Number: 5,378,134
[45] Date of Patent: Jan. 3, 1995

[54] PRESS FOR FORMING AN ARTICLE OF COMPOSITE MATERIAL COMPRISING REINFORCING FIBERS IN A POLYMER MATRIX

[75] Inventors: Philippe Blot, Nantes; Joël Augereau, La Chapelle Launay; Joël Bretagne, Saint Nazaire; Jean-Jacques Dittberner, Saint Andre Des Eaux, all of France

[73] Assignees: ACB; Societe Nationale Industrielle et Aerospatiale, both of Paris, France

[21] Appl. No.: 108,402

[22] Filed: Aug. 19, 1993

[30] Foreign Application Priority Data

Aug. 20, 1992 [FR] France .................. 92 10156

[51] Int. Cl.$^6$ .................. B29C 51/28; B29C 51/46
[52] U.S. Cl. .................. 425/149; 425/384; 425/389; 425/394
[58] Field of Search .................. 425/135, 149, 384, 389, 425/390, 394, DIG. 19

[56] References Cited

U.S. PATENT DOCUMENTS

| | | | |
|---|---|---|---|
| 4,185,069 | 1/1980 | Smith et al. | 425/384 |
| 4,447,201 | 5/1984 | Knudsen | 425/389 |
| 4,576,776 | 3/1986 | Anderson | 425/389 |
| 4,608,220 | 8/1986 | Caldwell et al. | 425/389 |
| 4,752,204 | 6/1988 | Kataoka | 425/384 |
| 4,943,070 | 7/1990 | Lang | 425/389 |

FOREIGN PATENT DOCUMENTS

| | | | |
|---|---|---|---|
| 0483849A1 | 5/1992 | European Pat. Off. | |
| 2235781 | 1/1975 | France | |
| 192209 | 4/1969 | Germany | |
| 971663 | 11/1982 | U.S.S.R. | 425/389 |

*Primary Examiner*—James P. Mackey
*Attorney, Agent, or Firm*—Sughrue, Mion, Zinn, Macpeak & Seas

[57] ABSTRACT

A press has a fixed lower platen, and an upper platen which is movable vertically by means of an actuator. A former corresponding to the article which is to be obtained is placed on the lower platen via a thermal insulation member, the former including channels for circulation of a heat exchange fluid. The material to be formed is placed on the former. The upper platen carries an assembly which has a resilient membrane, the periphery of which is sandwiched between a lower frame and a cover connected to a source of fluid under pressure, sealing between said membrane and the lid being ensured by the clamping pressure between these two parts which results partly from the force exerted on the moving platen and partly from the pressure of the fluid.

8 Claims, 3 Drawing Sheets

PRESS FOR FORMING AN ARTICLE OF COMPOSITE MATERIAL COMPRISING REINFORCING FIBERS IN A POLYMER MATRIX

The present invention relates to an apparatus for forming an article of composite material comprising reinforcing fibers in a polymer matrix.

BACKGROUND OF THE INVENTION

When reinforced by long fibers such as glass or carbon fiber, these materials are incapable of deformation by elongation, unlike metallic materials. The long fibers effectively prevent elongation.

The matrix may for example comprise a thermoplastic resin of known type, such as one from amongst those known as PEI, PEEK, PES or PPS. With matrices of this type and at a temperature above the softening temperature of the matrix, the matrix can be deformed in response to an applied force and the reinforcements which are arranged in layers in the matrix may be subject to differential displacements.

In order for a sheet to retain its mechanical properties after deformation which may generate internal faults, it is necessary that the sheet is formed at a sufficiently high temperature and under a pressure which ensures suitable compactness.

A method is described in document DE 3727926 for forming an article of material from sheets of fiber-reinforced thermoplastic material. In the method described, the sheet to be formed is hot-deformed by using a forming mould. Deformation is performed via a separation membrane to which sufficient pressure is applied to deform the membrane. The separation membrane is a sheet of aluminum, synthetic material, or rubber.

An aluminum sheet can only be used once, so it is desirable to use a resilient membrane of an elastomer.

The teaching in the above-mentioned document is insufficient to provide an industrial apparatus capable of producing articles at a rapid rate.

The first problem is that of rapid heating and cooling of the article after forming. The thermal inertia of the forming equipment such as that described in DE-A-3727926 considerably extends the heating time, and more particularly the cooling time.

OBJECTS AND SUMMARY OF THE INVENTION

A main object of the present invention is therefore to provide a forming press allowing the production of polymer matrix composite materials at a rate which is substantially faster than existing presses, irrespective of the forming temperature and the shape of the article to be formed.

A second problem arises if the polymer matrix requires a high forming temperature, for example in the range 300° C. to 400° C. There is currently no material available for making a re-usable membrane which is capable of stretching by 500% at those temperatures in a normal atmosphere.

In view of the very high cost of elastomer membranes, the forming method described in document DE-A-3 727 926 therefore carries severe penalties. Moreover, the requirement to replace the membrane after each forming operation substantially reduces the fabrication rate.

A third problem relates to the formation of articles which are concave, at least in part. The fibers jam between the membrane and the former and this causes the fibers to be torn during the forming process.

In accordance with the invention, this main object is achieved by a press for forming an article of composite material comprising reinforcing fibers embedded in a polymer matrix, forming taking place between a resilient membrane and a former of complementary shape to the article to be formed, the press comprising a lower platen carrying said former, an upper platen, clamping means for applying a clamping force between the platens, means for introducing fluid under pressure between the upper platen and the membrane, and means for heating and cooling the article to be formed, wherein the means for heating and cooling are completely integral with said former, the former being mounted on the lower platen via a thermal insulation means, and wherein the upper platen carries the resilient membrane.

By completely integrating the heating and cooling means with the former and by thermally isolating the former from the platen which supports it, the thermal inertia of the equipment is reduced considerably, which allows a substantial increase in the rate of fabrication. Increase in the rate is also facilitated by mounting the membrane on the upper platen.

This arrangement also assists in protecting the membrane from heat and increases its lifetime.

Advantageously, the upper platen of the press also carries, underneath the membrane, an intermediate member which ensures thermal protection of the membrane and/or avoids tearing of the fibers when the article to be formed is at least in part concave. For this purpose, this intermediate member is made of a thermally insulating material and/or has a shape complementary to that of the former mounted on the lower platen.

Moreover, in order to avoid premature damage to the resilient membrane by the crushing force to which it is subjected around its periphery, the press advantageously includes servo-control means responsive to the means for introducing fluid under pressure to control the clamping means so that the force exerted between the platens by the clamping means always exceeds the force exerted on the membrane by the fluid introduction means, by an amount lying between two acceptable thresholds.

In a preferred embodiment of the invention, the periphery of the resilient membrane is sandwiched between a cover mounted on the upper platen and a lower frame connected to the cover by securing means which allow rapid demounting. To facilitate mounting of the membrane, its periphery is preferably secured to an intermediate rigid frame.

In this same embodiment, the means for heating and cooling comprise means for causing a heating fluid and a cooling fluid to circulate in turn through channels internal to said former.

In order to ensure uniform heating of the article to be formed, particularly when a significant fraction of the surface of the article does not rest on the former, means may be provided for fitting the press with retractable auxiliary heating means which are suitable for placing just above the article to be formed when the upper platen carrying the membrane is remote from the former.

BRIEF DESCRIPTION OF THE DRAWINGS

An example of the invention is now described, with reference to the accompanying drawings in which.

MORE DETAILED DESCRIPTION

Figure 1:
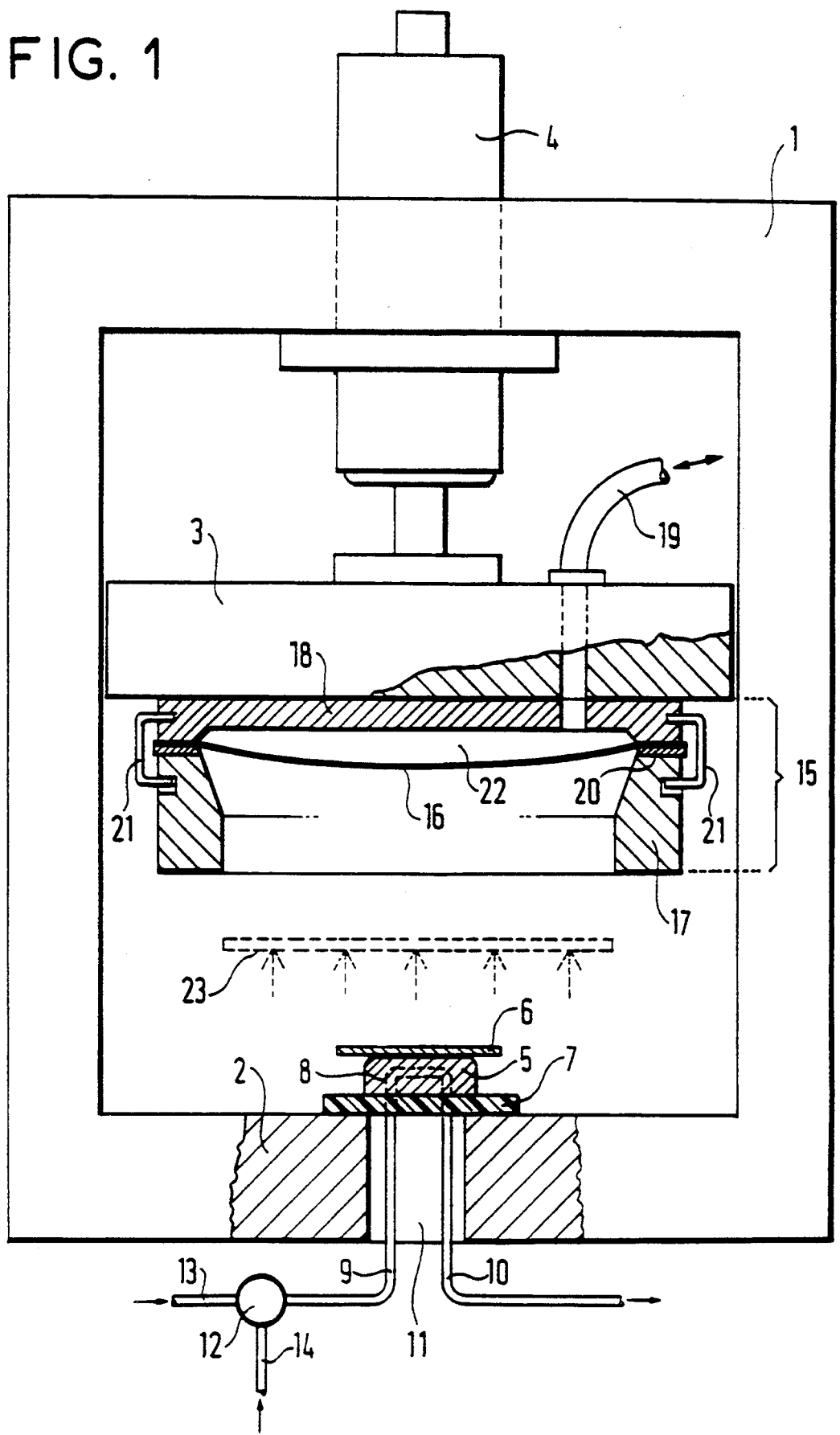
FIG. 1 is a schematic diagram of a press in accordance with the invention.

With reference to FIG. 1, the press comprises a framework 1 supporting a fixed lower platen 2. The framework also supports an upper platen 3, which is movable vertically by means of an actuator 4.

The lower platen 2 carries a former 5 corresponding to the profile which is to be obtained in the material 6 to be formed, the material being placed over that former 5. As stated earlier, material 6 is a composite material comprising reinforcing fibers in a polymer matrix. In the case of a thermoplastic matrix, the material is in the form of a rigid sheet or relatively flexible thin sheets, and in the case of a thermosetting matrix, in the form of flexible layers of pre-impregnated fibers.

Aluminum former 5, corresponding to the profile to be obtained, may be convex and form a kind of punch as in the case shown in the figure, but it may equally be concave and form a kind of mould.

This former 5 is thermally isolated from the fixed platen 2 by a thermal insulation means 7. This insulation may be obtained by a continuous layer of an insulating material or by a material which supports the former 5 only at a few contact surfaces or even by point contacts.

Former 5 includes channels such as 8 in which heat exchange fluid may be circulated. These channels are connected to external supply and evacuation pipes 9 and 10 respectively which pass through a passage 11 in the lower platen 2.

The supply pipe 9 is provided with a three-port valve 12 alternately supplying a hot fluid 13 to take the material 6 to be formed up to the forming temperature, for example between 300° C. and 400° C., and supplying a cooling fluid 14 to solidify the thermoplastic resin once forming has taken place.

The cooling fluid is at 80° C. for example. This system allows the articles to be formed at a rapid rate, by ensuring very rapid heating and cooling of the material 6 via the former 5. The insulation 7 avoids heat transfer to the lower platen 2 which would increase thermal inertia and therefore prevent fabrication at a high rate.

Only the former 5 undergoes rapid heating and cooling, which avoids damage to the membrane. Advantageously, oil is used as the heat conveying medium.

The upper platen 3 of the press carries an assembly 15 which comprises an elastomer resilient membrane 16, the periphery of which is sandwiched between a lower frame 17 and a cover 18. A chamber 22 formed between the cover 18 and the membrane 16 is connected by a conduit 19 to a source of fluid under pressure. The periphery of membrane 16 has previously been secured to a rigid and removable intermediate frame 20.

The three parts: the cover 18, the intermediate frame 20 with its membrane 16, and the lower frame 17 are assembled together by appropriate means such as brackets 21, which do not provide any clamping or sealing between the membrane and the cover 18, but which, on the contrary, leave a small amount of play between these three pieces. Sealing between the membrane 16 and the cover 18 is ensured by the force applied by the cover on the periphery of the membrane 16, this force resulting partly from the downward force exerted by the actuator 4 when the upper platen 3 bears against the lower platen 2 via the frame 17, and partly by the upward force exerted on the cover 18 due to the pressure of the forming fluid in chamber 22. This allows provision of a crushing pressure around the periphery of membrane 16 which is constant, or at least controlled between two permissible thresholds, by controlling the force of the actuator 4 by means of the pressure of the forming fluid in the chamber 22.

In fact, the pressure in chamber 22 may reach 30 kg/cm$^2$ and if the membrane were applied against the cover 18 with an initial force greater than the force due to that pressure, whilst the chamber 22 was no longer pressurized, then the periphery of the membrane 16 would be destroyed through crushing.

The apparatus therefore allows separation of the sealing function, which can be accurately controlled, from the forming function provided by the pressure in chamber 22.

As stated earlier, it may be necessary to associate retractable auxiliary heating means with the heating means that are integral with the former 5, so as to achieve uniform heating of the article if it rests on the former 5 at only a few points. As shown in FIG. 1, a radiant panel 23 is therefore provided which can be slid sideways, so that it can be temporarily situated just above the material 6 to be formed, when the press is open.

Once the forming temperature is reached due to the circulation of the hot fluid 13 and also because of the additional heating from the radiant panel 23, the press is closed and chamber 22 is pressurized.

The membrane 16 then deforms and applies the material 6 closely against the former 5.

The fluid utilized for the forming pressure may for example be air or nitrogen. A liquid fluid may equally well be utilized.

Once the material has been formed, the pressure is maintained in chamber 22 and consolidation of the material 6, in the case of a thermoplastic matrix, is ensured by cooling the material to below its softening temperature, by providing via 14 a cooling fluid, at 80° C. for example.

The pressure in chamber 22 is then reduced and the press is opened so as to withdraw the article obtained.

Figure 2:
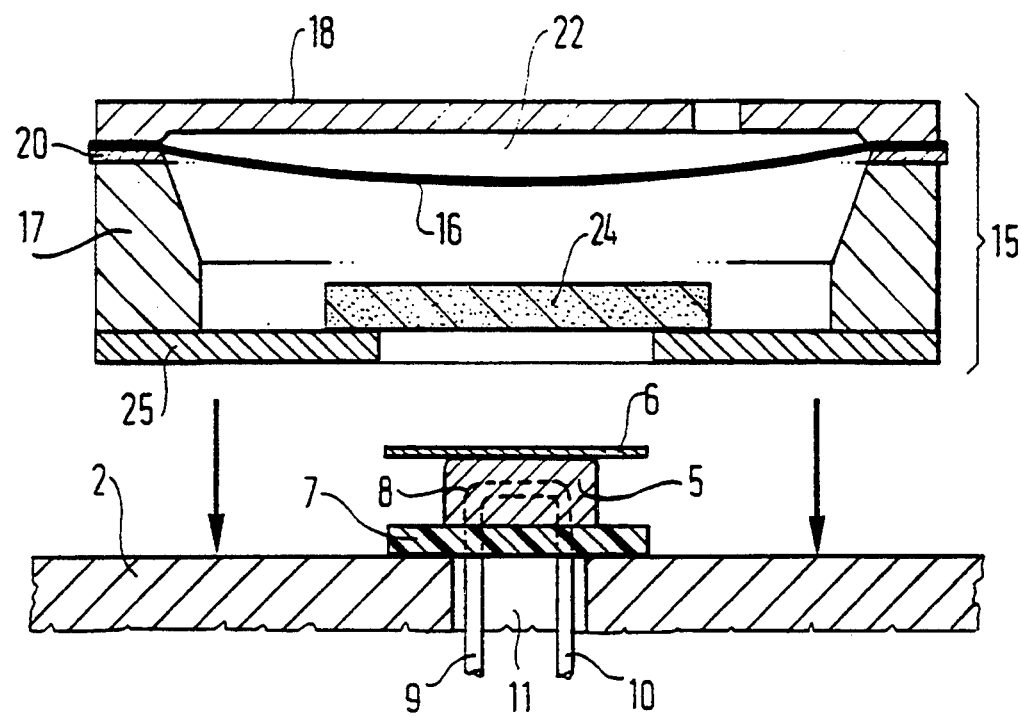
FIGS. 2 and 3 respectively show to an enlarged scale the open and closed positions of the active parts of the press.
Figure 3:
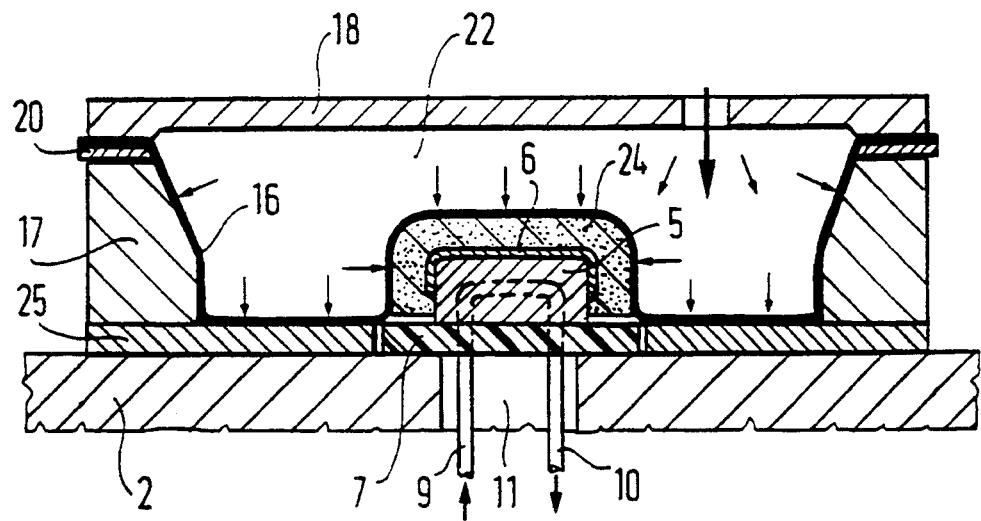

FIGS. 2 and 3 show just a portion of the press in the open and closed positions, this portion being made up of the "active" parts comprising the assembly 15 and the lower platen 2 with the insulator 7, the former 5 and the material 6 to be formed.

The purpose of these two figures is to show the use of a heat screen 24 allowing the heating of the membrane 16 to be limited so that it can be re-used numerous times even when the polymer matrix of the material to be formed requires a high forming temperature, for example in the range 300° C. and 400° C. This heat screen 24 is constituted by a silicon plate that is at least 2 mm thick, and whose periphery is free. It is supported by assembly 15 below the membrane 16, by means of a structure 25 connected to the frame 17.

Figure 4:
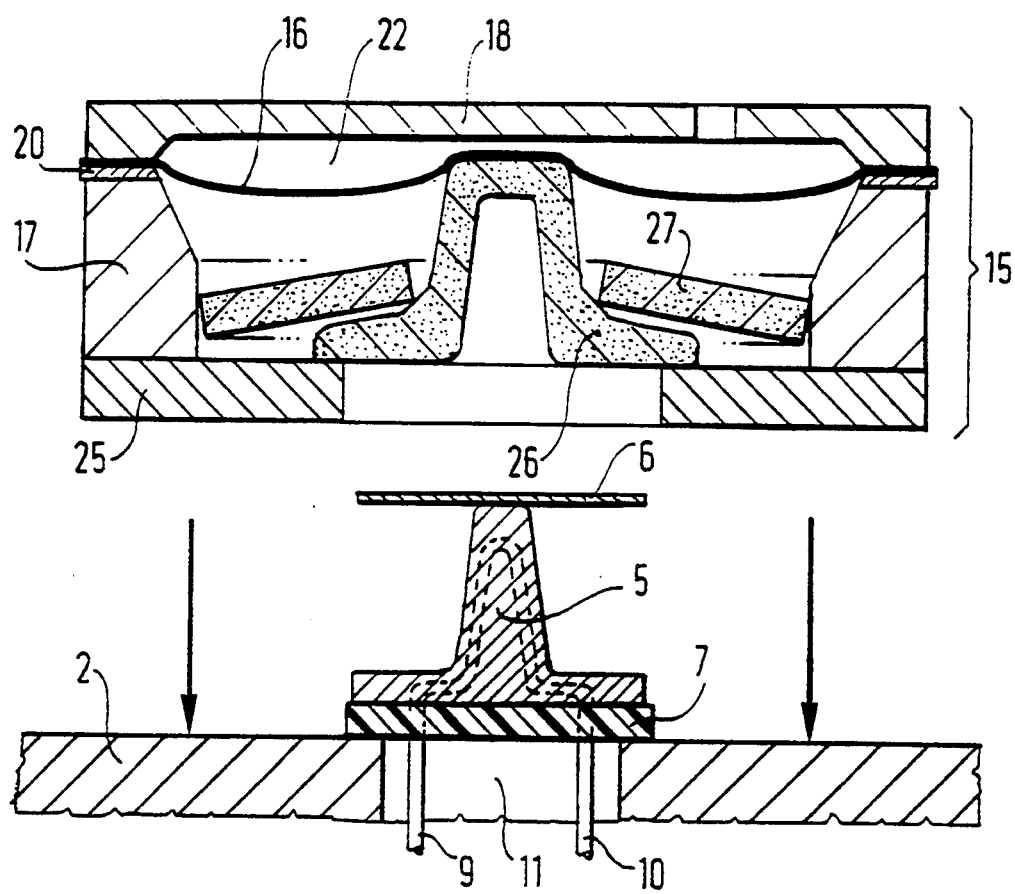
FIGS. 4 and 5 show a variant on FIGS. 2 and 3 in which a counter-form is used.
Figure 5:
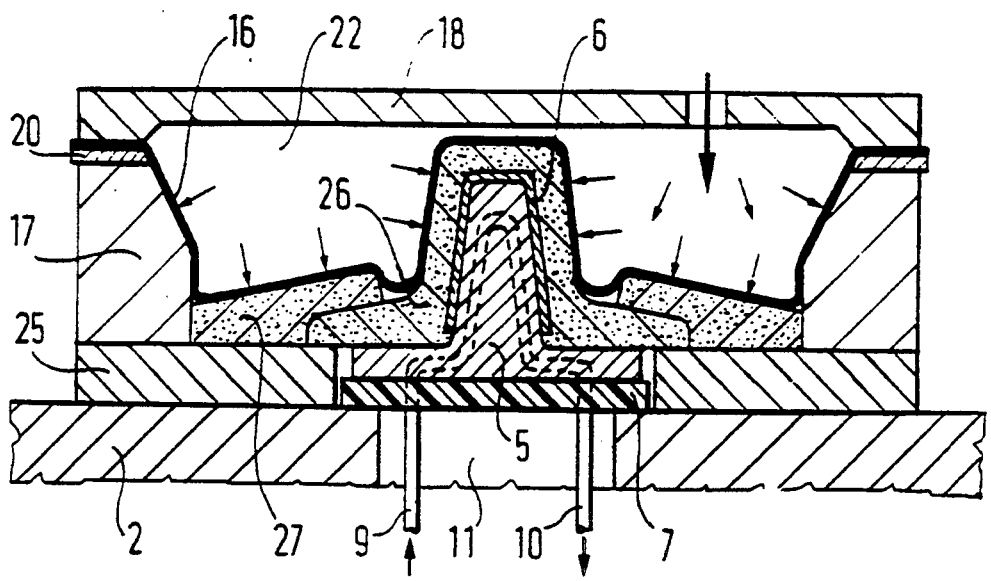

FIGS. 4 and 5 are similar to FIGS. 2 and 3 and their purpose is to show the use of an elastomer counter-former 26 of shape complementary to that of the former 5, and which is placed between the membrane 16 and the material 6 to be formed. This solution is adopted when the article to be produced is complicated in shape or when the shape has a concave profile. This counter-former has no effect on the isostatic pressure exerted against the material 6, as the pressure exerted in chamber 22 is high, of the order of 10 kg/cm$^2$ and possibly as high as 30 kg/cm$^2$, and as the counter-former is an elastomer. This counter-former also acts as a heat screen for the membrane 16 if necessary.

The heat screen 24, and the counter-former 26 if it is acting as a heat screen, must have a long-lasting resistance to the forming temperature, which may be about 350° C. for thermoplastic matrices.

Materials having the necessary properties are produced by the French company SAFIC-ALCAN for example. In addition to the counter-former 26, a packing piece 27 for wedging and also made of elastomer is provided in FIGS. 4 and 5.

Naturally, the press as described may function equally well with a fixed upper platen and a movable lower platen.

We claim:

1. A press for forming an article of composite material of reinforcing fibers embedded in a polymer matrix, forming taking place between a resilient membrane and a former of complementary shape to the article to be formed, the press comprising:

a lower platen carrying said former;

an upper platen;

clamping means for applying a clamping force between the platens; fluid introduction means for introducing fluid under pressure between the upper platen and the membrane;

means for heating and cooling the article to be formed, wherein the means for heating and cooling are completely integral with said former, the former being mounted on the lower platen via a thermal insulation means, and wherein the upper platen carries the resilient membrane; and servo-control means, responsive to the fluid introduction means, to control the clamping means so that the force exerted between the platens by the clamping means always exceeds the force exerted on the membrane by the fluid introduction means by an amount lying between two thresholds.

2. A press according to claim 1, wherein the periphery of the resilient membrane is sandwiched between a cover mounted on the upper platen and a lower frame connected to the cover by securing means which allow rapid disconnection of said cover and said lower frame.

3. A press according to claim 2, wherein the periphery of the resilient membrane is secured to an intermediate rigid frame which is removably sandwiched between said cover and said lower frame.

4. A press according to claim 1, wherein the means for heating and cooling comprise means for circulating in turn both a heating fluid and a cooling fluid through channels internal to said former.

5. A press according to claim 1, including retractable auxiliary heating means which are suitable for placing just above an article to be formed lying on the former when the upper platen carrying the membrane is at a distance from the former.

6. A press according to claim 1, wherein the upper platen also carries, underneath the membrane, an intermediate deformable member.

7. A press according to claim 6, wherein said intermediate member is made of a thermally insulating material.

8. A press according to claim 6, wherein said intermediate member has a shape complementary to that of said former.

* * * * *

UNITED STATES PATENT AND TRADEMARK OFFICE
CERTIFICATE OF CORRECTION

PATENT NO. : 5,378,134

DATED : January 3, 1995

INVENTOR(S) : Philippe BLOT et al

It is certified that error appears in the above-identified patent and that said Letters Patent is hereby corrected as shown below: —

On the title page:

Item: [73] Assignees: Please change the name of the second Assignee from "Societe Nationale Industrielle et Aerospatiale" to --AEROSPATIALE SOCIETE NATIONALE INDUSTRIELLE--.

Signed and Sealed this

Twenty-first Day of May, 1996

Attest:

BRUCE LEHMAN

Attesting Officer     Commissioner of Patents and Trademarks